United States Patent [19]

Corbett

[11] Patent Number: 4,700,912
[45] Date of Patent: Oct. 20, 1987

[54] LASER ILLUMINATION SYSTEM FOR AIRCRAFT LAUNCH AND LANDING SYSTEM

[75] Inventor: Marshall J. Corbett, East Northport, N.Y.

[73] Assignee: Grumman Aerospace Corporation, Bethpage, N.Y.

[21] Appl. No.: 855,303

[22] Filed: Apr. 24, 1986

[51] Int. Cl.$^4$ ............................................. B64F 1/00
[52] U.S. Cl. ................................. 244/63; 244/110 E; 244/114 R
[58] Field of Search ................ 244/63, 110 E, 114 R, 244/114 B, 1 R; 455/609, 610, 611; 430/945

[56] References Cited

U.S. PATENT DOCUMENTS

| | | | |
|---|---|---|---|
| 1,560,775 | 11/1925 | Gibbons | 244/63 |
| 1,705,432 | 3/1929 | Westcott . | |
| 1,709,058 | 4/1929 | Brunner . | |
| 2,268,320 | 12/1941 | Brandt . | |
| 2,355,948 | 8/1944 | Bonstow et al. . | |
| 2,371,629 | 3/1945 | Lee . | |
| 2,497,427 | 2/1950 | Weiss | 244/114 R |
| 2,807,429 | 9/1957 | Hawkins, Jr. et al. . | |
| 3,081,970 | 3/1963 | Einarsson . | |
| 3,196,822 | 7/1965 | Bertin et al. . | |
| 3,436,036 | 4/1969 | Madelung . | |

FOREIGN PATENT DOCUMENTS

| | | | |
|---|---|---|---|
| 1164245 | 2/1964 | Fed. Rep. of Germany . | |
| 2506974 | 9/1976 | Fed. Rep. of Germany . | |
| 2514148 | 4/1983 | France | 244/114 R |
| 868342 | 5/1961 | United Kingdom . | |

OTHER PUBLICATIONS

"Northrop Using Argon Laser To Measure Vortex Flow, " *Aviation Week,* Jul. 29, 1985, p. 66.

Primary Examiner—Joseph F. Peters, Jr.
Assistant Examiner—Rodney Corl
Attorney, Agent, or Firm—Pollock, VandeSande & Priddy

[57] ABSTRACT

A giant column of air is employed to assist in the vertical take-off and landing of an aircraft. The column of air is forced through movable louvers which steer the aircraft on the air column. A pressure differential occurs on top of the air column so as to center an aircraft on the air column. In order to illuminate the air column, a salt spray is introduced into the column and a laser source resonates the crystals of the salt thereby causing energy to be radiated from the column which may be detected and displayed by an approaching aircraft.

10 Claims, 5 Drawing Figures

LASER ILLUMINATION SYSTEM FOR AIRCRAFT LAUNCH AND LANDING SYSTEM

FIELD OF THE INVENTION

The present invention relates to aircraft launch and landing systems, and more particularly to a laser system for illuminating a giant column of air which is capable of assisting in the vertical launching and landing of aircraft.

BACKGROUND OF THE INVENTION

Vertical take-off and landing (VTOL) aircraft are used in tactical situations where extended runways are not available for conventional jet fighters. This includes unimproved land areas and ships smaller than aircraft carriers.

The typical VTOL aircraft must have power capacity greatly in excess of that required for flying. This is due to the fact that the VTOL aircraft requires high power to vertically take off and land. This excess power requirement results in a heavier aircraft which comprises optimum performance and efficiency characteristics.

In my co-pending U.S. patent application Ser. No. 855,285, the structure and method for permitting vertical take off and landing of aircraft, including supersonic fighter aircraft on a smaller ship, are provided. This avoids the necessity of providing a fleet with expensive and specialized VTOL aircraft which cannot achieve the performance and efficiency standards of regular supersonic aircraft.

In accordance with the co-pending invention, means are provided for generating an air column above the deck of a ship which has a bucket-shaped pressure ridge on the top of the column having the capability of "capturing" an aircraft which enters the column in a "deep stall" condition. The air column is then controlled to gently lower the aircraft to the deck of a ship.

In order to vertically take off, the column of air is used to raise the aircraft to a point well above the ship deck. The aircraft can then quickly depart from the air column by entering a full thrust condition.

By equipping smaller ships, such as destroyers, with the necessary means for generating an air column, conventional supersonic aircraft may be used instead of costly and less-efficient VTOL.

BRIEF DESCRIPTION OF THE PRESENT INVENTION

The present invention is directed to a laser system for illuminating the column of air which captures an aircraft thereby enabling a pilot to see the air column and "bucket" during take-off and landing.

Illumination of the air column is achieved by salting the column and employing a laser operating at a frequency resonant with the salt crytals. In the event the laser is to operate in the non-visible spectrum, a laser imager may be installed in the aircraft to display the illuminated column on a cockpit or head-up display.

The above-mentioned objects and advantages of the present invention will be more clearly understood when considered in conjunction with the accompanying drawings, in which:

DETAILED DESCRIPTION OF THE PRESENT INVENTION

Figure 1:
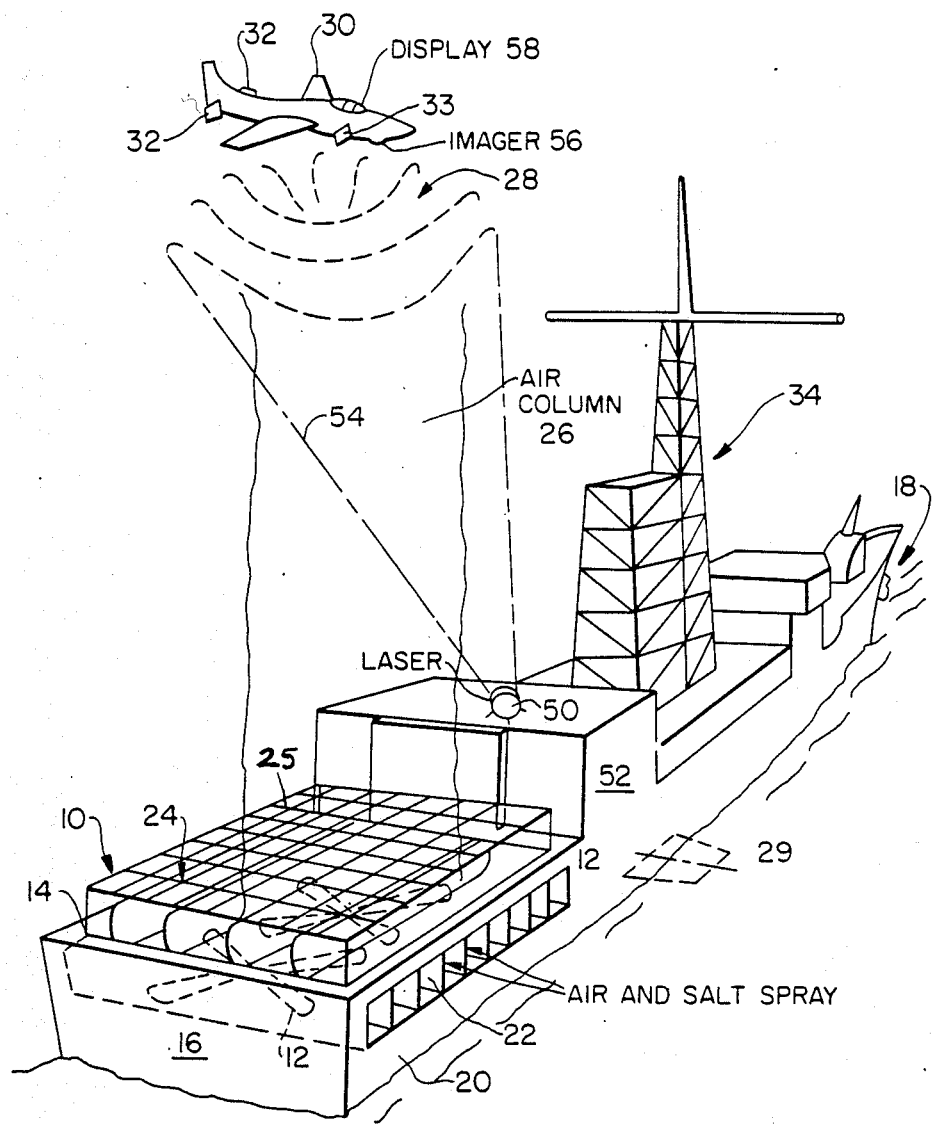
FIG. 1 is a diagrammatic perspective view of a ship equipped with the present invention.

FIG. 1 illustrates the basic concept of my referenced co-pending application and the present invention. A relatively small ship, such as destroyer 18, has its aft deck 14 equipped with the vertical take-off and landing apparatus of the co-pending application, generally illustrated by reference numeral 10. The apparatus includes two side-by-side giant fans 12 located below the deck at the stern 16 of the ship. Although two fans are illustrated, the number will depend upon the type of aircraft handled as well as the size of the ship.

Figure 2:
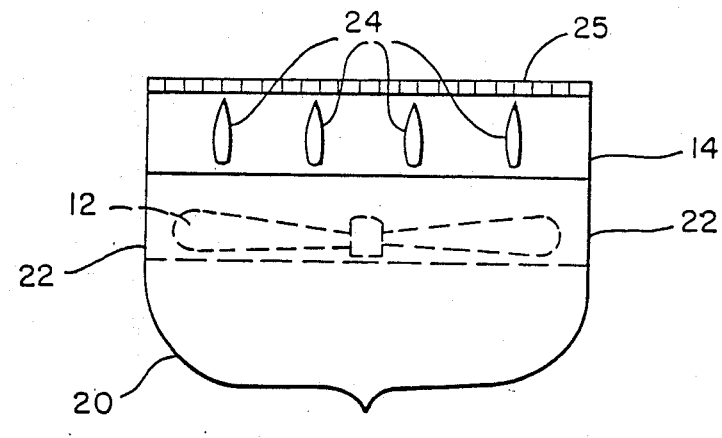
FIG. 2 is a diagrammatic end view of the ship as illustrated in FIG. 1.

A plurality of movable deck louvers 24 are mounted over the fans; and as partially shown in FIG. 2, a grill 25 may cover the top of the louvers to provide a support for aircraft. The sides 20 of the ship include air supply vents 22 which may be covered when not in use. When the fans 12 are operated, air is swept in through the vents 22 and deflected by the louvers 24 to form an air column 26. The column is sufficiently high to permit an aircraft 30, sitting atop the column of air to enter a full thrust condition and obtain sufficient air speed for flight before hitting the water. Since the air velocity at the tip sections of each fan is greater than that at the hub, column 26 forms a pressure bucket 28 which tends to center a "captured" aircraft 30 on the column.

During vertical landing, as an aircraft 30 approaches column 26, it may achieve "deep stall" by moving its horizontal stabilizers 32 and 33 to a downward vertical position. In this "deep stall," the aircraft 30 descends into and is cradled by the bucket 28. The aircraft may be lowered onto the grid 25 (FIG. 2) by decreasing the velocity of the fans 12 to apply decreasing pressure to the underside of the aircraft.

By slowly diminishing the pressure exerted by the air column on the aircraft while still maintaining bucket 28, the aircraft 30 is gently lowered for landing. The optimum position for the air column 26 exists when it is substantially perpendicular to the wing plane of aircraft 30. This can be accomplished by operating the louvers in one of the following ways: vectoring; pendulum operated; gyroscopically operated; or dynamically connected to conventional movable roll fins 29. Movable roll fins 29 are provided on the ship sides 20, below the water line, to prevent possible sinking of the bow 16 and to add critical stability to the ship 18. The movable roll fins are also employed to maintain ship roll at a maximum of approximately 30°. The fins or other shipboard roll control devices are not, per se, part of the present invention. Although they are desirable they are not necessary for operation of the present invention. The louvers may be controlled so that air column 26 is steered to be substantially perpendicular to the wing plane of the aircraft in the presence of ship roll.

The procedure for vertical take-off is the reverse of that of landing. An aircraft is initially located above grid 25 on the aft deck section. The fans then slowly increase the height of the column 26 while maintaining bucket 28 so that the aircraft 30 gradually attains an elevated position relative to the deck of the ship. The horizontal stabilizers 32 and 33 are positioned to a "deep stall" condition and the aircraft enters a full thrust condition. This causes the aircraft to leave the column and slowly dive toward the surface of the water. However, with sufficient air column height, the aircraft will gain adequate air speed to allow it to gain altitude before contacting the water surface.

Figures 3, 4:
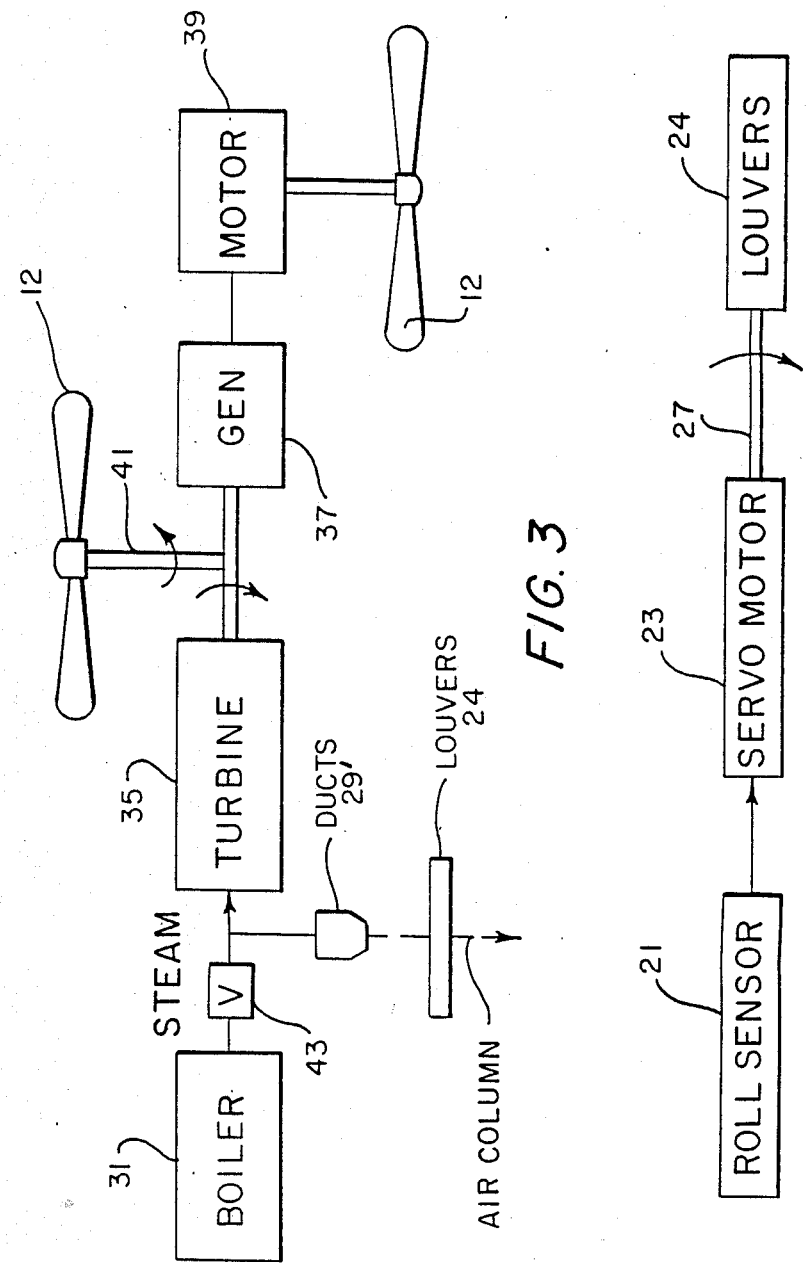
FIG. 3 is a block diagram of various means for powering a giant fan which creates the air column as utilized in the present invention.
FIG. 4 is a block diagram of a servo mechanism for controlling the position of louvers as employed in the present invention.

A servo mechanism for varying louver position in the presence of ship roll is shown in FIG. 4. A conventional roll sensor 21 generates an electrical signal to a servo motor 23 in accordance with the degree of ship roll. The servo motor 23 has a shaft 27 which rotates the mechanically linked louvers 24 to an appropriate offsetting position. As will be appreciated, the angles of the louvers are adjusted to steer an aircraft during landing or take-off in a manner which will compensate for roll of the ship.

FIG. 3 illustrates a variety of means for powering the fans 12 from shipboard power sources. In a preferred embodiment of the invention, plentiful steam from boiler 31 provides the energy for powering the fans 12 through a variable control valve 43. The steam may power a turbine 35 which has its output shaft connected to shaft 41 of fan 12. Preferably, the turbine 35 would be located under the louvers 24 in order to make power transmission most efficient. If space prohibits this, the turbine 35 may alternately drive generator 37 which in turn powers motors 39. The motor 39 may drive a respective fan 12. It is also possible to eliminate use of the fan and instead direct steam from boiler 31 or another shipboard source of gas or steam through ducts 29' so that the steam is directed through louvers 24, thereby resulting in an air column such as 26 (FIG. 1). Although this last-discussed system would have a greater energy efficiency than by using the fans, it would require more complex and elaborate control in order to achieve the "bucket" 28 at the top of the air column. By using a steam adjustment device such as valve 43, the energy for creating the air column 26 may be controlled in a variable manner to enable the height of an air column to be slowly and precisely varied to enable gentle raising and lowering of an aircraft.

For shipboard use, it would be desirable to steer the ship downwind so that deck wind is avoided and turbulence caused by motion of the ship superstructure 34 is mimimized. Vertical take-off and landing is preferably done athwart ship or sideways to the length of the ship, thereby minimizing collision mishaps with the superstructure 34 of the ship.

Figure 5:
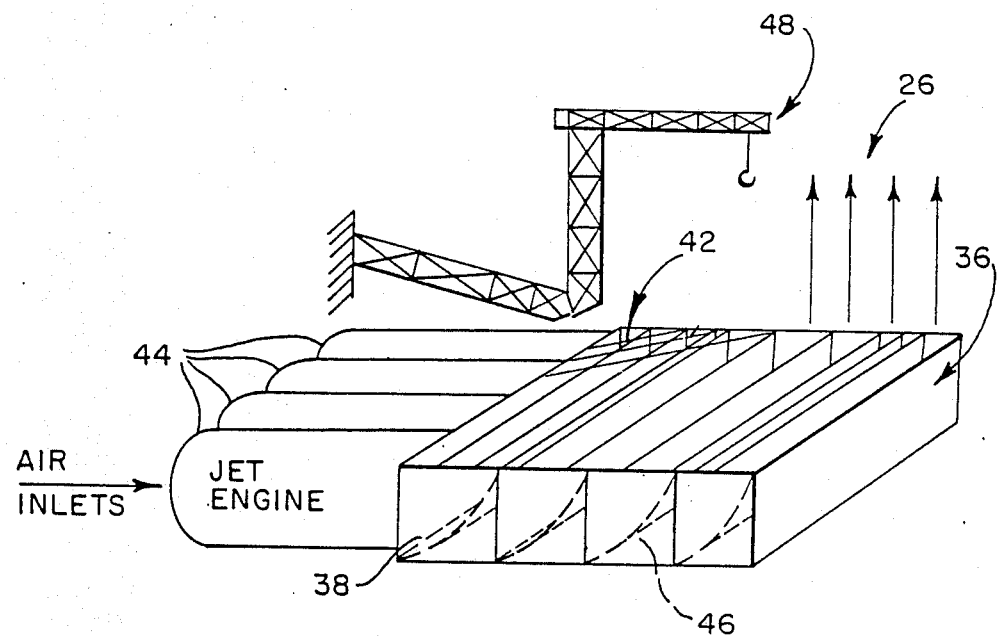
FIG. 5 is a diagrammatic illustration of a land-based system for generating an air column in accordance with the present invention.

Although the co-pending application deals with shipboard use, it is equally applicable for land installation where a sufficient runway is not present. FIG. 5 illustrates the structure necessary for accomplishing such a land-based system. A plurality of jet engines 44 are employed to generate sufficient airflow to form an air column 26. A louvered structure 36 having individual louvers 38 may be constructed above ground with openings to admit airflow from the jet engines 44. Curved baffles 46 are incorporated inbetween the louvers to deflect the airflow from the jet engines 44 to a vertically upward air column 26. The top of the louvered structure is covered with a grid 42 to permit an aircraft to rest atop the structure.

During take-off, an aircraft is moved by a crane 48 to a hoisted position over the louvers. Then, the jet engines 44 are activated and the column of air 26 can elevate the aircraft to a higher position while the crane is withdrawn in preparation of a full thrust take-off. In a reverse fashion, after a plane has landed on the louvered structure, the crane 48 moves it to an adjacent ground position off the louvered structure.

In a land-based system illustrated in FIG. 5, it is necessary to control the delivery of the air from the jet engines to the louvers in a manner that will ensure the presence of a "bucket" 28 atop the air column. This is accomplished by designing the plenums between the louvers in a manner ensuring greater air velocity at the periphery of the louvered structure 38 than at its hub so that an equivalent air column configuration can be obtained as compared with the air column created by fans.

In both the land-based and shipboard systems, it is preferable to cover the top of the louvered structure when not in use, thereby preventing damage to the interior of the structure.

In order to illuminate the column of air 26 and bucket 28 for a pilot, the present invention offers a laser system. A source of illumination is a laser 50 which is mounted atop ship structure 52. In tactical seaboard operations, ship pilots are reluctant to surround their vessel with visible light sources. Accordingly, the laser 50 could be made to operate in the non-visible, infrared range.

Normally, air and salt spray enter vents 22 so that air column 26 is seeded with salt spray. The laser source 50 is selected so that its emitted light is resonant with the salt crystals in the salt spray. By directing the laser beam 54 along air column 26, the salt spray in the column will reflect light energy. In applications where a lighted air column is of no consequence, a pilot aboard the aircraft 30 may visibly sight the column in order to achieve accurate take-off or landing of the aircraft. However, as previously mentioned, in tactical situations at sea, it may be necessary to select laser 50 to operate in the non-visible light spectrum. Since the reflected light from a non-visible laser source will also be non-visible, it is necessary to incorporate a laser imager 56 into the aircraft 30 for detecting the non-visible reflections of light from air column 26. This type of laser imager may be of the type utilized in a number of armored vehicle and missile weapon control systems existing at the present time. The location of the imaged air column is presented to a pilot on a conventional head-up or cockpit display 58 of the type installed within fighter aircraft. The laser imager 56 is tuned to the wavelength of reflected energy from the salted air column 26.

In operation of the system, laser 50 is turned on only during the short periods for take-off and landing of aircraft so that enemy detecting devices do not detect the presence of the ship.

Although the use of lasers to illuminate aircraft vortices in wind tunnels has been previously accomplished, the present invention offers a patentably distinct application for laser illumination of airflow.

It should be understood that the invention is not limited to the exact details of construction shown and described herein, for obvious modifications will occur to persons skilled in the art.

I claim:

1. In a system for assisting an aircraft to vertically take off and land in a preselected area, the system having:
   means for generating a column of air having a centrally depressed pressure distribution across the top thereof for capturing an aircraft on the column;
   means for controlling the height of the column thereby enabling an aircraft to be raised or lowered to the preselected area by the air column;
   a column illuminator comprising:
      means for seeding the air column with a crystalline material; and
      means for causing resonant excitation of the crystalline material thereby radiating detectable energy from the column which defines the column boundaries.

2. The structure set forth in claim 1 wherein the seeding means comprises means for introducing a salt solution spray into the column.

3. In a system for assisting an aircraft to vertically take off and land in a preselected area, the system having:
   means for generating a column of air having a centrally depressed pressure distribution across the top thereof for capturing aircraft on the column;
   means for controlling the height of the column thereby enabling an aircraft to be raised or lowered to the preselected area by the air column;
   a column illuminator comprising:
   means for seeding the air column with a crystalline material; and
   means for causing resonant exicitation of the crystalline material thereby radiating detectable energy from the column which defines the column boundaries;
   wherein the means for causing resonant excitation of the material includes a laser light source.

4. In a system for assisting an aircraft to vertically take off and land in a preselected area, the system having:
   means for generating a column of air having a centrally depressed pressure distribution across the top thereof for capturing aircraft on the column;
   means for controlling the height of the column thereby enabling an aircraft to be raised or lowered to the preselected area by the air column;
   a column illuminator comprising:
   means for seeding the air column with a crystalline material; and
   means for causing resonant excitation of the crystalline material thereby radiating detectable energy from the column which defines the column boundaries;
   wherein the means for causing resonant excitation of the material includes a laser light source; and further wherein the seeding means comprises means for introducing a salt solution spray into the column.

5. In a shipboard-based landing and take-off system for aircraft, the system including:
   at least one fan located within the deck of the ship for generating an upwardly directed air column having a centrally depressed pressure distribution across the top thereof for capturing an aircraft on the column;
   vent means located in the ship for supplying air and saltspray to the fans;
   movable louvers located above the fans for steering the air column to compensate for ship roll;
   a grid located above the louvers for supporting an aircraft thereon prior to take-off and after landing;
   a column illuminator comprising a laser directed toward the column for causing resonance of salt crystals in the column thereby radiating detectable energy from the column and defining the boundaries of the latter.

6. The structure set forth in claim 5 wherein an aircraft is outfitted with means for detecting the radiated energy from the column and displaying an output thereof.

7. In a method for effecting vertical take-off and landing of an aircraft on board a ship including the steps:
   generating a vertical air column above the deck of the ship;
   creating a centrally depressed pressure distribution across the top of the air column for capturing an aircraft thereon;
   controlling the height of the column thereby enabling an aircraft to be raised or lowered to the deck by the air column:
   illuminating the column comprising the steps:
      seeding the air column with a crystalline material; and
      causing a resonant excitation of the crystalline material thereby radiating detectable energy from the column which defines the column boundaries.

8. The method set forth in claim 7 wherein the seeding step is accomplished by introducing salt solution spray into the column.

9. The method set forth in claim 8 together with the steps of:
   detecting the energy radiated from the column; and
   displaying the radiated energy thereby defining the boundary of the column.

10. The method of claim 7 wherein the step of causing resonant excitation includes the use of a laser directed toward the column.

* * * * *

UNITED STATES PATENT AND TRADEMARK OFFICE
CERTIFICATE OF CORRECTION

PATENT NO. : 4,700,912
DATED : October 20, 1987
INVENTOR(S) : Marshall J. Corbett It is certified that error appears in the above-identified patent and that said Letters Patent is hereby corrected as shown below:

Column 1, line 61, change "crytals" to --crystals--.

Column 3, line 36, change "motors" to --motor--.

Column 3, line 54, change "mimimized" to --minimized--.

Column 5, line 32, change "exicitation" to --excitation--.

Signed and Sealed this

Third Day of May, 1988

Attest:

DONALD J. QUIGG

*Attesting Officer*   *Commissioner of Patents and Trademarks*